(No Model.) 6 Sheets—Sheet 1.
I. F. GILMORE & G. W. PADGET.
CORN HUSKING MACHINE.
No. 419,250. Patented Jan. 14, 1890.
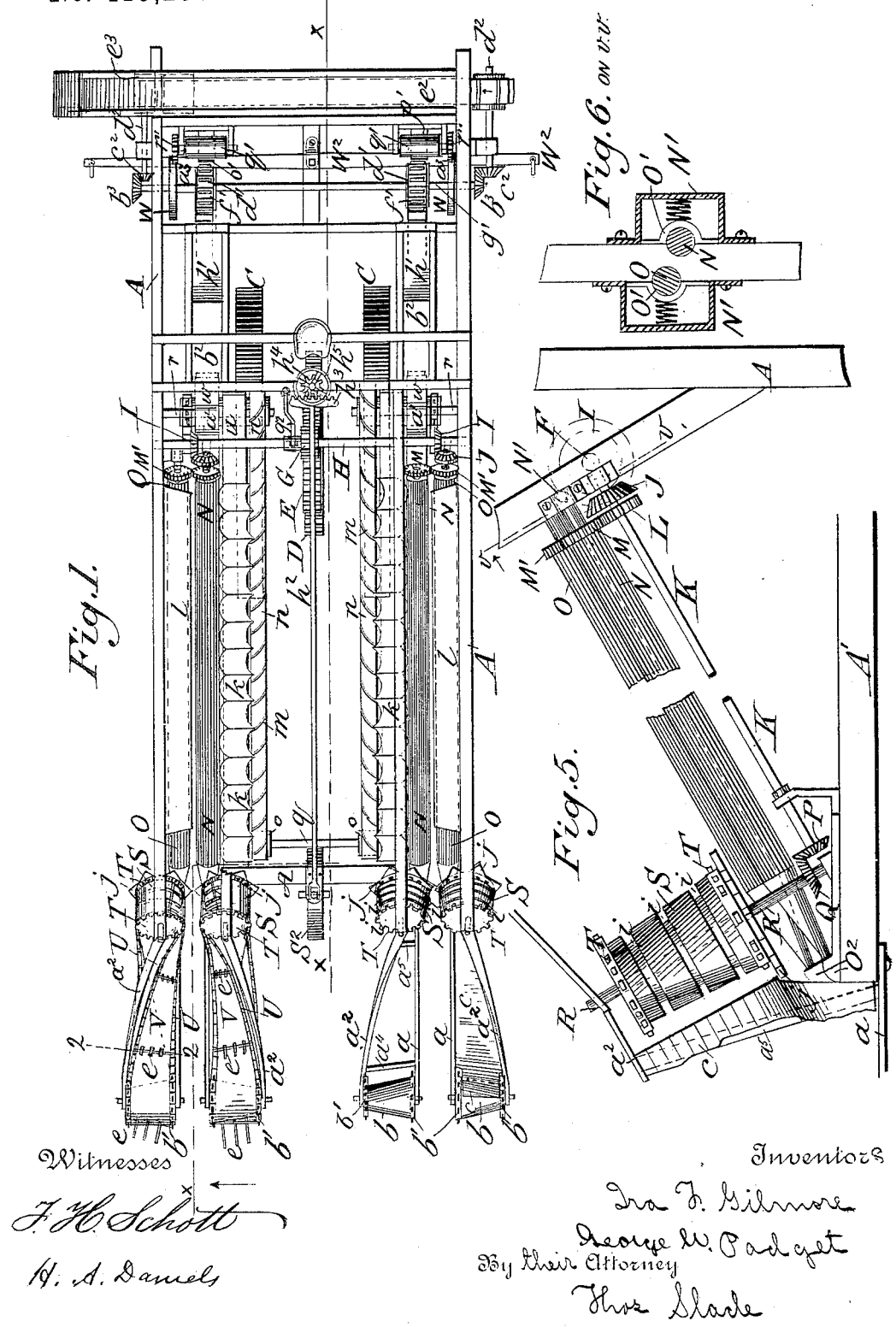

(No Model.) 6 Sheets—Sheet 2.
I. F. GILMORE & G. W. PADGET.
CORN HUSKING MACHINE.
No. 419,250. Patented Jan. 14, 1890.
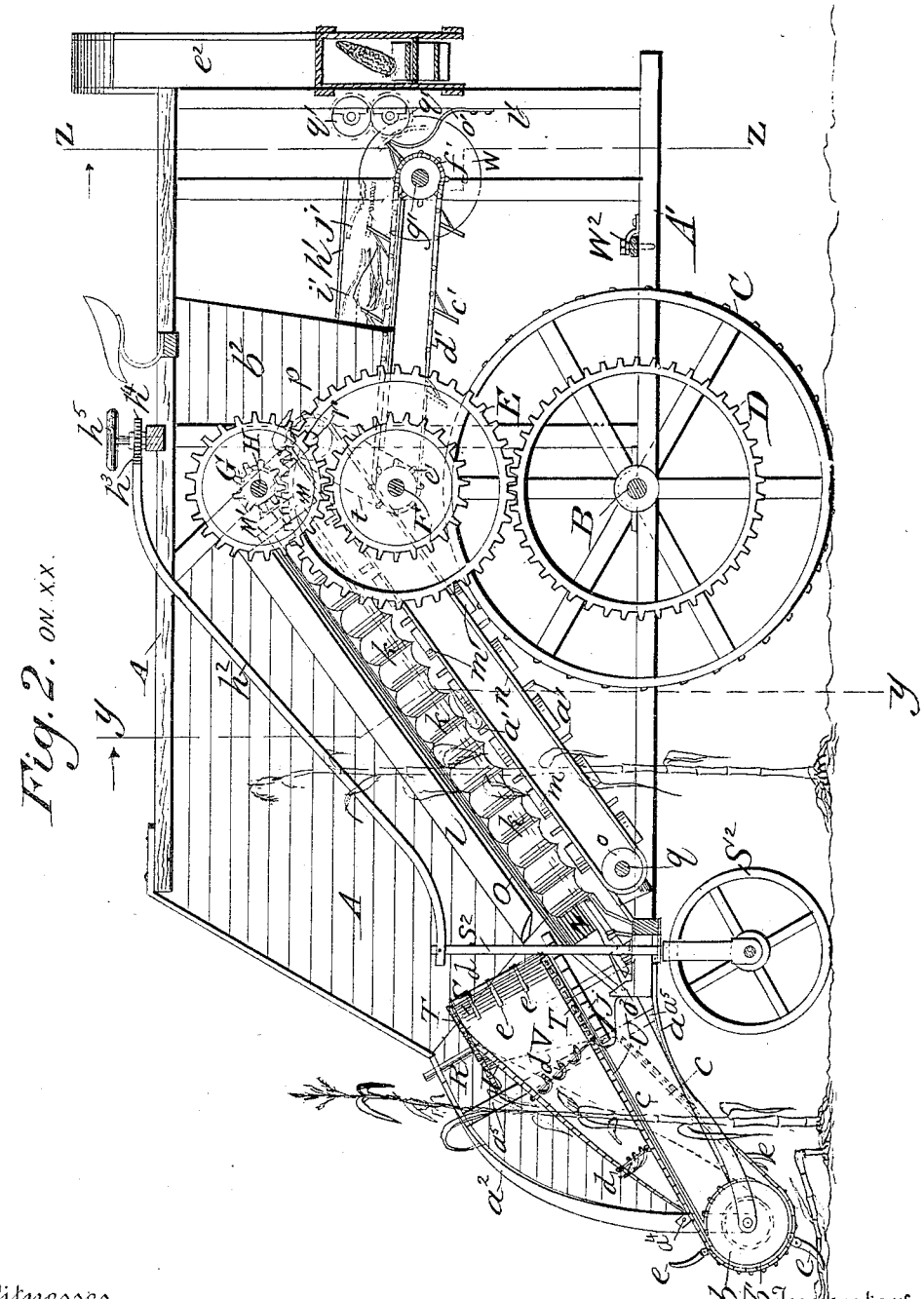

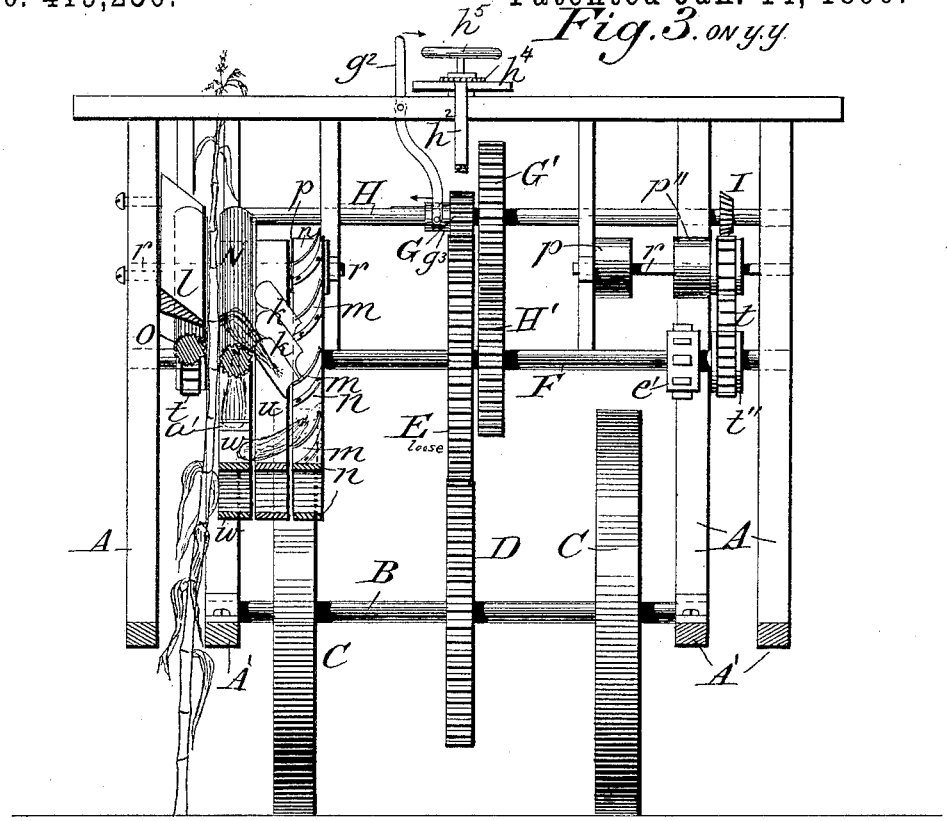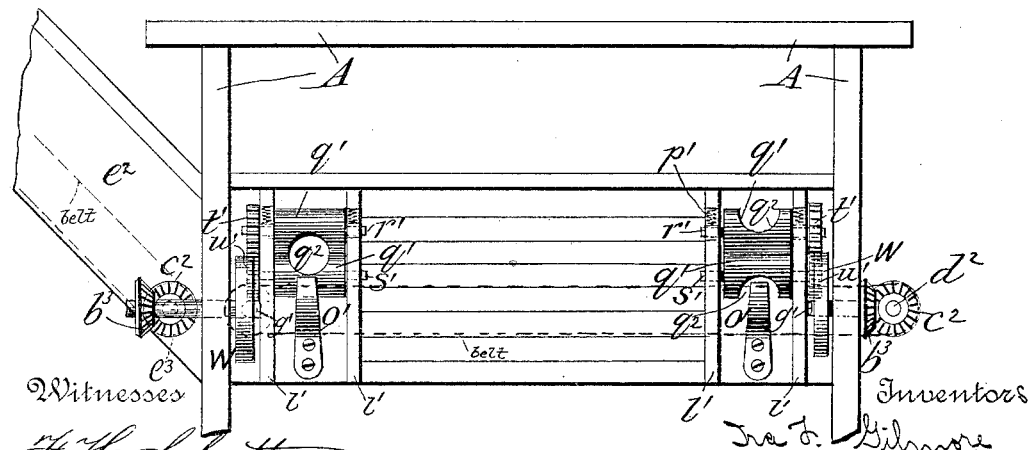

(No Model.) 6 Sheets—Sheet 4.
I. F. GILMORE & G. W. PADGET.
CORN HUSKING MACHINE.
No. 419,250. Patented Jan. 14, 1890.
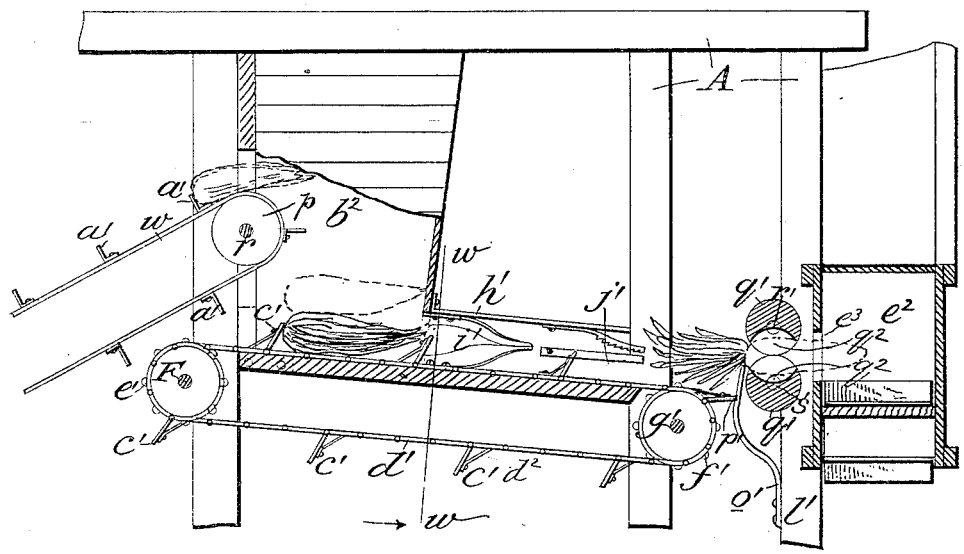
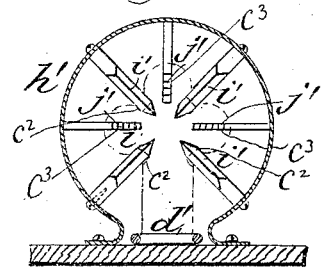

(No Model.) 6 Sheets—Sheet 5.

I. F. GILMORE & G. W. PADGET.
CORN HUSKING MACHINE.

No. 419,250. Patented Jan. 14, 1890.

Witnesses
F. H. Schott
H. A. Daniels

Inventors
Ira F. Gilmore
George W. Padget
By their Attorney
Thos Slade (No Model.) 6 Sheets—Sheet 6.
I. F. GILMORE & G. W. PADGET.
CORN HUSKING MACHINE.
No. 419,250. Patented Jan. 14, 1890.
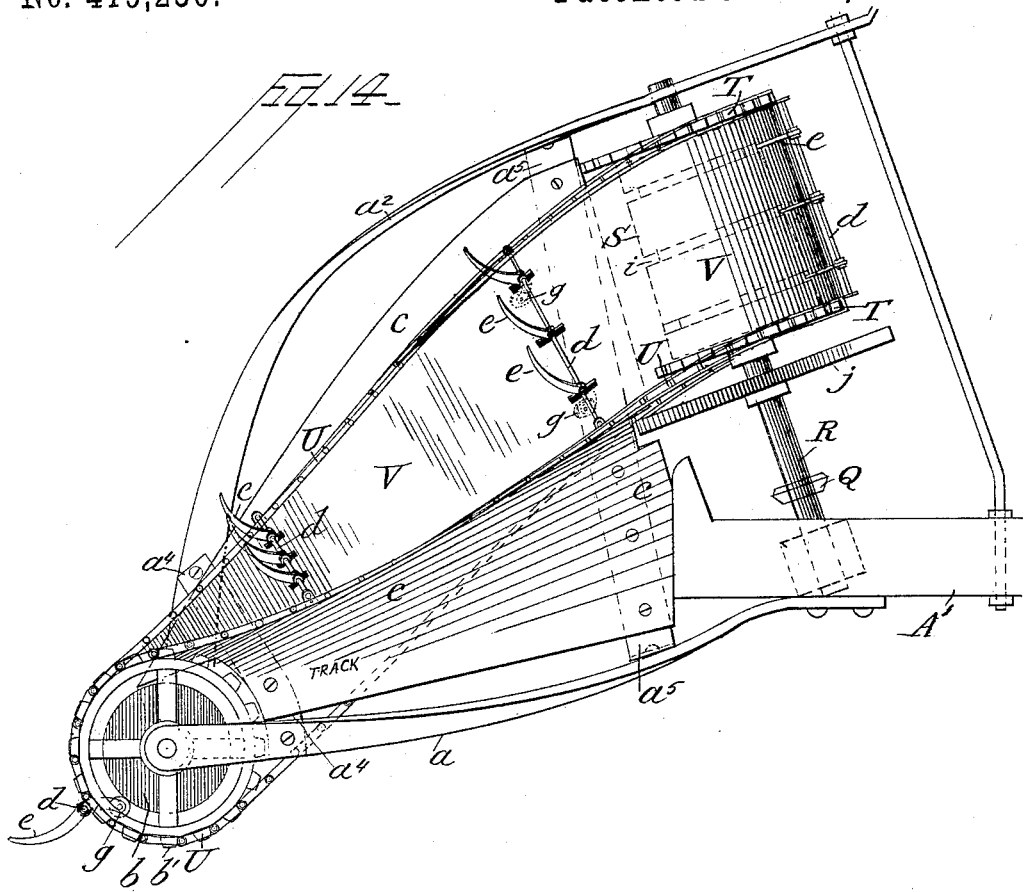
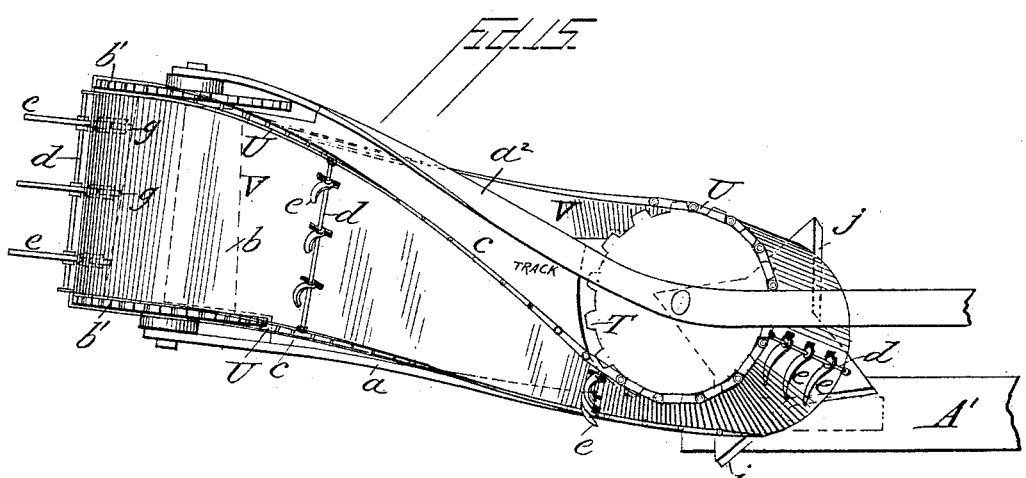
Witnesses
F. H. Schott
Wm Burris
Inventor
Ira F. Gilmore &
G. W. Padgett
By W. H. Ruff Attorney

UNITED STATES PATENT OFFICE.

IRA F. GILMORE AND GEORGE W. PADGET, OF LEROY, ILLINOIS.

CORN-HUSKING MACHINE.

SPECIFICATION forming part of Letters Patent No. 419,250, dated January 14, 1890.

Application filed September 27, 1886. Serial No. 214,680. (No model.)

*To all whom it may concern:*

Be it known that we, IRA F. GILMORE and GEORGE W. PADGET, citizens of the United States, residing at Leroy, in the county of McLean, State of Illinois, have invented certain new and useful Improvements in Corn-Husking Machines, of which the following is a specification, reference being had therein to the accompanying drawings.
Our invention relates to an improvement in corn harvesting and husking machines, the object of the same being to provide a machine of this character by means of which the corn may be removed from the standing stalk, husked, and delivered to suitable receptacles carried upon or alongside the machine.

A further object is to provide a machine of the above character consisting of the certain features of construction and combinations of parts, as will be hereinafter fully described, and pointed out in the claims.

Figure 11:
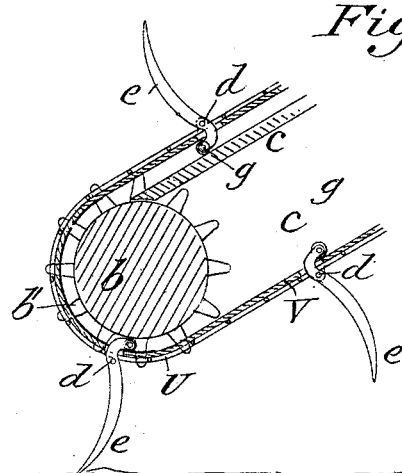
Figure 12:
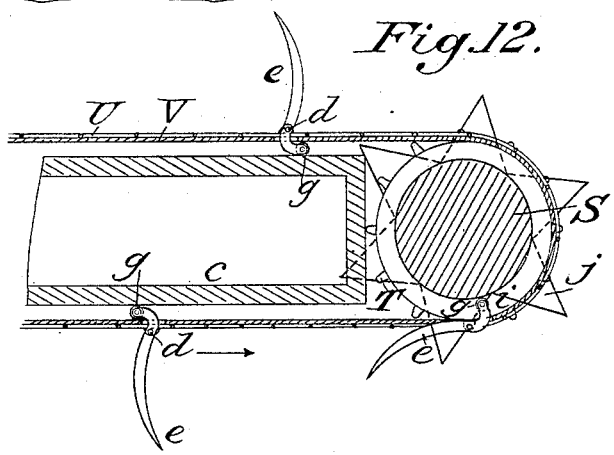
Figure 13:
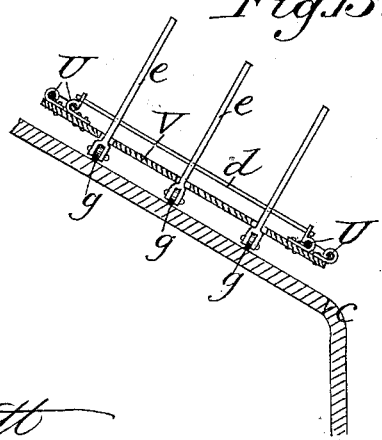

In the accompanying drawings, Figure 1 is a top plan view of a machine embodying our invention. Fig. 2 is a longitudinal vertical section thereof on line $x\ x$ of Fig. 1. Fig. 3 is a vertical section on line $y\ y$ of Fig. 2. Fig. 4 is a vertical section on line $z\ z$ of Fig. 2. Fig. 5 is a detail view of the rollers and lower cone-pulley. Fig. 6 is a section showing the spring-cushioned rollers. Fig. 7 is a vertical section of the devices for conveying the ears from the elevating-belts $w$ to the husking-knives, stripping-claws, and cutting-off rollers. Fig. 8 is a sectional view of the husk-slitting knives on line $w\ w$ of Fig. 7. Fig. 9 is an enlarged side view of the gearing for driving the cutting-off rollers $q'\ q'$. Fig. 10 is a perspective detail of the belt $d'$ with one of its teeth $c'$. Fig. 11 is a partial longitudinal sectional view of one of the rollers $b$, with its accompanying chains U, apron V, fingers $e$, and track $c$. Fig. 12 is a partial horizontal section of one of the rollers S, toothed wheel $j$, track $c$, apron V, chains U, and fingers $e$, showing the manner in which they are dropped out of the way. Fig. 13 is a cross-section of the apron V and chains U on line 2 2 of Fig. 1. Fig. 14 is a side view of the mechanism for lifting and straightening the stalks. Fig. 15 is a plan view of the same.

A represents a suitable supporting-frame, in which is mounted the axle B, on which are journaled the peripherally-spurred supporting-wheels C. Keyed on the central part of the axle B is the cog-wheel D, the same meshing with the cog-wheel E, loosely secured on shaft F, extending transversely through the machine, said cog E engaging the small cog-wheel G, fast on and driving the overlying shaft H, also extending transversely through the machine, and on the opposite ends of which are secured the bevel-gears I, meshing with the bevel-gears J, secured on the shafts K, the said shafts underlying the snapping-rollers and having the gears L secured at their upper ends and meshing with the gears M on the upper ends of the corrugated rollers N, the adjoining rollers O having similar gears M', whereby the rollers are revolved, so that their upper surfaces have a motion toward each other. The rollers N and O are arranged in pairs and are journaled at their rear ends, one pair in each of the journal-boxes N', the construction of which is shown in Fig. 6, and are yieldingly mounted therein by means of the spring-bearings O', the object of which is to enable the rollers to yield when stalks of extra size come in contact therewith. The front ends of these rollers are journaled in step-bearings $O^2$, secured to the frame A below the star-wheels $j$ $j$. These rollers are tapered at their forward ends, as shown, to permit the ready entrance between them of the stalks from the star-wheels. The shafts K are further provided with the bevel-gears P at their lower ends, adapted to engage the bevel-gears Q on the lower ends of the vertical shafts R. To the said shafts R are secured the cone-pulleys S, the same being provided with the sprocket-wheels T at top and bottom engaging the sprocket-chains U, carrying the endless aprons V.

To the frame of the machine are suitably secured the arms $a$ and $a^2$, the former running parallel with the sills A' and the latter being curved downwardly and extending from the top of the frame A to points opposite to the ends of arms $a$, as shown. The said arms carry the cone-shaped rollers $b$ in their forward ends, the said rollers being provided with the sprocket-wheels $b'$ at each end to engage the chains U. The track or way $c$ is attached to the arms $a$ and $a^2$ by means of the cross-braces $a^4$ and $a^5$, as shown. To the chain U and overlying the aprons are secured the rods $d$, to which are pivoted the fingers $e$, the inner ends of which pass through the endless aprons V and are provided with the rollers $g$, suitably journaled therein, the apron being constructed of any flexible material, so that it can take the quarter-twist required by the sprocket-wheels, and secured to the chains by means of suitable rivets. Between the arms $a$ and $a^2$ is secured the track or way $c$, which extends from the top of the rollers $b$ to within a short distance of the sprocket-wheels T, and is of such shape as to conform to the twist of the apron V, with which it is substantially parallel. This track $c$ extends under the upper part of the apron V and at a suitable distance from it to enable the rollers $g\,g$ to move along said track below the apron and keep the fingers $e$ upright as they are carried along by the chains U. The fingers $e$ lift the leaning and down stalks from the ground, and, in conjunction with the quarter-twisted apron V, gradually straighten and bring the stalks to an upright position until near the toothed or star wheels $j$, when the rollers $g\,g$ pass off the platform or track $c$, the want of support of which causes the fingers to fall back on the apron and relieve the stalks, which are now supported by the wheels $j$. Immediately after the fingers drop, the rollers $g$ pass into the grooves $i$ in the pulleys S, which are of the required depth. After the fingers have passed around pulleys S the rollers $g$ move out of the grooves $i$, and said fingers are carried by the chains down to the front rollers or pulleys $b$, where the rollers $g$ ride on the surface of said pulleys $b$, and the fingers pass near the ground, catching the down stalks and raising them, as before described, the rollers $g$ passing onto the track $c$ again. The pulleys $b$ and S do not support or drive the aprons V, (which are secured to and moved by the chains U,) but serve to bring the fingers $e$ into and out of action, as before described. The pulleys $b$ may be tapered, or preferably slightly tapered, as shown in Fig. 15 in dotted lines, in order to increase the leverage of the fingers $e$ of each row from within outward, in order to equalize the pressure of said rollers on the pulleys $b$, as the weight of the stalks increases from their bottoms to their tops by reason of the ears. Thus it will be seen that the fingers $e$ engage the stalks, and the twisted aprons will direct them toward the corrugated rollers N and O, at which point the toothed or star wheels $j$ take them and pass them between the rollers N and O, whose upper surfaces turn toward each other and snap or break the ears from them, which ears fall into chutes $k$, being directed thereto by the inclined guide-boards $l$. These boards $l$ extend nearly the entire length of the rollers O and project from the side frames of the machines over the rollers O, which are somewhat higher than rollers N. The object of these boards is to prevent the severed ears from falling to the ground over rollers O, and also by their inclination to direct the severed ears over rollers N to the concave chutes $k$, which form a continuous series, extending along the side of each roller N, and incline downwardly toward the belts $n$. The lower ends of the chutes $k$ are located at a sufficient distance above the belts $n$, as shown in Fig. 2, to allow the ears to pass under them as they slide from the belts $n$ across the platforms $u$ to the elevating-belts $w$. From the chutes $k$ the ears fall into the scoops $m$, which are obliquely secured on the turning-belts $n$, said belts being mounted to run on pulleys $o$ and $p$, secured, respectively, on shafts $q$ and $r$, located near the opposite ends of the snapping-rollers. The shafts $r$ are driven by means of the belts $t$ on the shaft F, which is driven by cog G' on shaft H, meshing with cog H' on shaft F. The elevator-belts $w$ run parallel with the turning-belts $n$, but are separated from them by a platform $u$, the belts and platform being substantially on the same level with each other. Each belt $w$ is mounted on pulleys secured to shafts $q$ and $r$, the pulleys $p''$ on shafts $r$ being the drivers. The ears, after falling from the chutes $k$ onto the belts $n$, rest against the cups $m$, which are secured to said belts in an oblique manner with their lower ends directed toward the stationary platforms $u$. The ears slide from the cups $m$ by gravity and are guided or forced thereby across the platforms $u$ onto the elevating-belts $w$, where they are caught and held by means of the fingers $a'$ on said belts while they are being elevated to the feed-boxes $b^2$, as shown. The boxes $b^2$ are only of sufficient width to accommodate one ear of corn circumferentially, and, while several ears may accumulate on top of each other, yet the box is of such proportions as to prevent their being wedged side by side. From the boxes $b^2$ the ears are conveyed into the passages $h'$, which project from the bottoms of the boxes in line with the ears of corn, and which are of such height as to only permit the entrance of one ear at a time therein from the boxes $b^2$, as they are conducted by the teeth $c'$ on the belts $d'$, which move on the bottoms of each box and passage, as shown, and are mounted on sprocket-wheels $e'$ and $f'$ on shafts F and $g'$, respectively. The shaft $g'$ is journaled in the frame-work, as shown in Fig. 4, a short distance below the passages $h'$, and is driven by the belts $d'$ on sprocket-wheels $e'$ on shaft F. The ears are brought in contact with the knives $i'$, which are secured in the passages $h'$, as shown in Fig. 8, preferably four in number, and are so set that the shuck of each ear passing between them will be cut and the corn itself remain uninjured. The ears are next ready for the stripping process, accomplished by means of the toothed spring-claws $j''$. These claws, which are preferably three in number, are secured to the inside periphery of the passage $h'$ and project radially downward, and are arranged alternately with the radially-projecting slitting-knives, as shown, and are made of any spring metal and converge at their free ends in order to grasp the shuck at its entrance to the claws and strip the ears as they pass through. To the standards $l'$ are secured the springs $o'$ immediately in front of the lower rollers $q'$. The rollers $q'$ are secured on the shafts $r'$ and $s'$. These shafts are of ordinary construction and are journaled in standards $l'$. Each tooth $c'$ on the chain belts $d'$ is secured thereto by a brace $d^2$, and is formed, as shown in Fig. 10, with four notches $c^2$ to allow the passage of the knives $i$ as they cut the shucks. Each tooth has also three notches $c^3$, arranged alternately with the notches $c^2$, as shown, to allow the passage of the stripping-claws as they strip the shucks from the ears. A groove $p'$ is made in the front face of the tooth, and when the tooth reaches spring $o'$ said spring will follow up in said groove and be forced against the butt of the ear, thus relieving the tooth from the ear at the same time that the tooth, in passing around pulley $f'$, bears against the spring $o'$, pushing it with the ear toward the rollers $q'$, as shown. The rollers $q'$ are provided with the semicircular depressions $q^2$ on their peripheries, through which, when the depressions on two corresponding rollers register, they are allowed ready passage, and the shuck is pulled from the ears by the edges of said depressions. The upper rollers are mounted in spring-bearings, whereby a yielding movement is allowed when ears of large size pass between them. The shafts $s'$ are driven by means of the pinions $t'$ and $u'$. The lower ones $u'$ have delay-shoes on their sides, (one for each pinion,) which are concaved on one edge, as shown at $w'$, to permit the rim of the segmental gear-wheel W to slide therein in order to hold the said pinions $u'$ at rest until they are driven by the sections of cogs $a^3$ upon the wheels W, (one section on each wheel.) Each section $a^3$ has the same number of teeth as a pinion $u'$, the object of which is to give intermittent motion to the rollers $q'$. The outer ends of the shafts $g'$ of the wheels W are provided with the bevel-gears $b^3$, meshing with similar gears $c^2$ on the shafts $d^2$, journaled in the elevator-spout $e^2$, running across the machine, into which, through openings $e^3$, the shucked ears pass as they leave the rolls $q'$. The elevator-spout is provided with an endless belt or conveyer having the usual vanes or stops for conveying the ears to the top thereof.

The cog-wheel G is adapted to slide on its shaft in order to be disengaged from contact with the cog-wheel E by means of the pivoted lever $g^2$, which embraces the collar $g^3$ on said wheel G, whereby, when the machine is not in operation, by shifting the lever in the direction of the arrow the driving-gear will be released and the parts made inoperative.

The machine is provided with the steering caster-wheel $S^2$, mounted in the beams $A'$, the same being operated by means of the crank-wheel $h^5$, to which is secured the cog-wheel $h^4$, which meshes with the segment $h^3$ on the pivoted bar $h^2$.

$W^2$ represents a doubletree, to which the horses are attached for moving the machine.

Having thus described our invention, what we claim as new, and desire to secure by Letters Patent, is—

1. In a corn-snapping harvester, the combination of rollers open at their lower ends for the entrance of the stalks, vertically-arranged guiding-pulleys at the front ends of the rollers having sprocket-wheels on their ends, arms extending forward from the pulleys and carrying horizontally-arranged guide-pulleys, driving-chains provided with folding fingers, and a supporting-track between the pulleys for the purpose of holding the teeth extended, so as to lift and straighten the stalks, substantially as shown and described.

2. The combination, with lifting-fingers provided with rollers adapted to ride on a track of an endless twisted apron placed over said rollers on said fingers for the purpose of supporting the stalks while they are being raised by the fingers, horizontal and vertical pulleys arranged to carry the chains which drive said aprons, arms for carrying the pulleys, and a track extending between said pulleys for supporting the rollers, whereby the fingers are held extended, so as to raise the stalks, substantially as shown and described.

3. The combination, in a harvesting-machine, of folding fingers $e$ $e$, pivoted to rods $d$, secured to chains U, and having rollers $g$ on their lower ends, adapted to be supported by a track $c$, and thereby be held extended to raise the stalks, an endless twisted apron secured to and driven by chains U and located above the rollers $g$ for supporting the stalks, horizontally-arranged pulleys, vertically-arranged pulleys grooved for the reception of the folded fingers, arms for carrying said pulleys, a track extending between the pulleys and to within a short distance of the vertical pulley, whereby the fingers are folded as they run off said track to release the stalks as they are caught by the star-wheels, and the star-wheels $j$, substantially as shown and described.

4. The combination of the longitudinally-corrugated snapping rollers, the inclined guide-board $l$, overhanging one of the rollers, the concave chutes $k$ at the side of the opposite roller, the turning-belt at the lower edge of the chutes provided with oblique scoops, the stationary platform located under the chutes, and the elevating-belt arranged under the rollers, substantially as and for the purposes described.

5. The combination, with a feed-box $b^2$, having a closed passage $h'$, provided with slitting-knives and toothed stripping-claws projecting inwardly and arranged alternately at converging angles with each other, of a feed-belt adapted to move along the bottom of the passage $h'$ and provided with teeth having notches for the passage of the knives and grooves $p'$ for the reception of a relieving-spring placed at the end of the feed-belt, a relieving-spring $o'$, located in front of the lower shuck-removing roller $q'$, and the shuck-removing rollers arranged immediately behind the relieving-spring, substantially as shown and described.

6. The combination of slitting-knives and stripping-claws projecting inwardly and arranged alternately at converging angles with each other, and a braced tooth $c'$, attached to a feed-belt and having notches $c^2$ and $c^3$, arranged alternately and at converging angles with each other for the passage of said knives and stripping-claws, and a groove $p'$ for the reception of a pushing and ear-relieving spring $o'$, with spring $o'$, located in front of the shuck-removing rollers $q'$, and the shuck-removing rollers, substantially as shown and described.

7. The combination of the yieldingly-mounted shuck-removing rollers $q'$ $q'$, provided with semicircular depressions $q^2$, forming cutting-edges, pinion $t'$, pinion $u'$, having a delay-shoe on its side concaved, as shown at $w'$, and a segmental gear-wheel W, having a section of cogs $a^3$ for driving the pinions and rollers intermittently, substantially as shown and described.

8. In a corn-harvester, the combination of corrugated snapping-rollers open at their lower ends, vertically-arranged guiding-pulleys at the front ends thereof, horizontally-arranged guiding-pulleys in advance of the vertical pulleys, driving-chains provided with folding fingers running over said pulleys, a supporting-track between the pulleys for holding the fingers extended, a guide-board overhanging one of the snapping-rollers, concave chutes $k$ at the side of the opposite roller, the turning-belt running along the lower edge of the chutes and provided with oblique scoops, the stationary platform located under the chutes, elevating-belt arranged under the rollers, feed-box, closed passage provided with inwardly-projecting knives and stripping-claws, feed-belt adapted to move along the bottom of said passage and provided with notched, grooved, and braced teeth, a pushing and ear-relieving spring arranged at the end of the feed-belt, and the yieldingly-mounted shuck-removing rollers having semicircular depressions forming cutting-edges, substantially as shown and described.

In testimony whereof we affix our signatures in presence of two witnesses.

IRA F. GILMORE.
GEORGE W. PADGET.

Witnesses:
ARTHUR J. KEENAN,
CHAS. A. BARLEY.